(12) United States Patent
Gao

(10) Patent No.: US 11,949,223 B2
(45) Date of Patent: Apr. 2, 2024

(54) DIRECT-CURRENT POWER SUPPLY PARALLEL-MACHINE INPUT REVERSE CONNECTION PREVENTION CIRCUIT AND SERVER SYSTEM

(71) Applicant: Inspur Suzhou Intelligent Technology Co., Ltd., Suzhou (CN)

(72) Inventor: Pengfei Gao, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 93 days.

(21) Appl. No.: 17/763,019

(22) PCT Filed: Dec. 30, 2019

(86) PCT No.: PCT/CN2019/130081
§ 371 (c)(1),
(2) Date: Mar. 23, 2022

(87) PCT Pub. No.: WO2021/056917
PCT Pub. Date: Apr. 1, 2021

(65) Prior Publication Data
US 2022/0344931 A1  Oct. 27, 2022

(30) Foreign Application Priority Data

Sep. 27, 2019  (CN) .......................... 201910927263.X

(51) Int. Cl.
*H02J 7/00*          (2006.01)
*H02H 11/00*      (2006.01)
(52) U.S. Cl.
CPC ......... *H02H 11/003* (2013.01); *H02J 7/0034* (2013.01)

(58) Field of Classification Search
CPC .. H02M 3/1588; H02M 3/158; H02M 3/1584; H02M 3/156; H02M 3/1582;
(Continued)

(56) References Cited

U.S. PATENT DOCUMENTS 9,899,867 B2 * 2/2018 Brhlik ........................ H02J 7/34

FOREIGN PATENT DOCUMENTS

| CN | 202363968 | 8/2012 |
| CN | 106300321 | 1/2017 |

(Continued)

OTHER PUBLICATIONS

1st Office Action corresponding CN application, The State Intellectual Property Office of People's Republic of China, Application No. or Publication No. 201910927263.X, dated May 29, 2020.
(Continued)

*Primary Examiner* — Bryan R Perez
(74) *Attorney, Agent, or Firm* — David R. Stevens; Stevens Law Group

(57) ABSTRACT

A direct-current power supply parallel-machine input reverse connection prevention circuit and a server. The circuit comprises a first switch tube, second switch tube (Q2). A first end of the first switch tube is used for being connected to a positive end of a first power supply and a second end of the first switch tube is connected to a positive input end of a first driving module. A first end of the second switch tube is used for being connected to a positive end of a second power supply and a second end of the second switch tube is connected to a positive input end of a second driving module.

7 Claims, 4 Drawing Sheets

(58) Field of Classification Search
CPC ............. H02M 3/33507; H02M 3/155; H02M 3/1586; H02M 3/33592; H02M 3/3376; H02M 1/32; H02M 1/0032; H02M 1/0009; H02M 1/4225; H02M 1/36; H02M 1/08; H02M 1/0006; H02M 1/0058; H02M 1/009; H02M 1/10; H02M 1/0025

See application file for complete search history.

(56) References Cited

FOREIGN PATENT DOCUMENTS

| CN | 206135414 | | 4/2017 | |
| CN | 206135414 U | * | 4/2017 | ............. H02H 11/00 |
| CN | 106911187 | | 6/2017 | |
| CN | 109193922 | | 1/2019 | |
| CN | 110504668 | | 11/2019 | |

OTHER PUBLICATIONS $2^{nd}$ Office Action corresponding CN application, The State Intellectual Property Office of People's Republic of China, Application No. or Publication No. 201910927263.X, dated Apr. 25, 2021.
$3^{rd}$ Office Action corresponding CN application, The State Intellectual Property Office of People's Republic of China, Application No. or Publication No. 201910927263.X, dated Sep. 30, 2021.
China National Intellectual Property Administration, International Search Report, PCT/CN2019/130081, dated Jun. 18, 2020, pp. 1-6.
Patent Cooperation Treaty, Written Opinion of the International Searching Authority, PCT/CN2019/130081, dated Jun. 18, 2020, pp. 1-11.

* cited by examiner

DIRECT-CURRENT POWER SUPPLY PARALLEL-MACHINE INPUT REVERSE CONNECTION PREVENTION CIRCUIT AND SERVER SYSTEM

CROSS REFERENCE TO RELATED APPLICATIONS

This application claims priority of Chinese Patent Application No. 201910927263.X, filed to China National Intellectual Property Administration on Sep. 27, 2019, entitled "DIRECT-CURRENT POWER SUPPLY PARALLEL INPUT ANTI-REVERSE-CONNECTION CIRCUIT AND SERVER SYSTEM", the entire contents of which are incorporated herein by reference.

TECHNICAL FIELD

The application relates to the field of a power supply, and particularly relates to a direct-current power supply parallel input anti-reverse-connection circuit and a server system.

BACKGROUND

With the development of science and technology, more and more electronic devices appear in people's lives. In an electronic device using an external power supply, if the power supply of the electronic device is reversely connected, the electronic device may be permanently damaged. In order to prevent the above phenomenon, a power supply input anti-reverse-connection solution is usually adopted in the prior art.

However, the above-mentioned power supply input anti-reverse-connection solution aims at one single power supply, i.e., a case that one electronic device is only supplied with power by one power supply. In a server system, a redundant power supply is often adopted. For example, in the server system, two power supplies constitute the redundant power supply, and when one power supply fails, the other power supply can immediately take over the work of the failed power supply. However, if the above-mentioned power supply input anti-reverse-connection solution is applied to the redundant power supply, and for example, in a power supply 1+1 redundant parallel test, if it is tested that two power supplies are reversely connected, i.e., one power supply is positively connected and one power supply is reversely connected, a device damage problem may be produced.

SUMMARY

For solving the problems above, the present application provides a direct-current power supply parallel input anti-reverse-connection circuit and a server system.

In order to achieve the above objective, the present application adopts the following technical solution.

A direct-current power supply parallel input anti-reverse-connection circuit includes: a first power supply, a second power supply, a first switching tube, a second switching tube, a first driving module, and a second driving module; wherein
a first end of the first switching tube is configured to be connected with a positive end of the first power supply, and a second end of the first switching tube is connected with a positive input end of the first driving module;
a negative input end of the first driving module is configured to be connected with a negative end of the first power supply, wherein the negative input end of the first driving module is a grounding end;
the first driving module converts the power supply and provides the converted power supply to a load;
a first end of the second switching tube is configured to be connected with a positive end of the second power supply, and a second end of the second switching tube is connected with a positive input end of the second driving module;
a negative input end of the second driving module is configured to be connected with a negative end of the second power supply, wherein the negative input end of the second driving module is a grounding end;
the second driving module converts the power supply and then provides the converted power supply to the load; and
wherein when the second power supply is reversely connected, the first switching tube is turned on, and the second switching tube is turned off, so as to prevent a current from flowing to the negative end of the second power supply from the positive end of the first power supply; and when the first power supply is reversely connected, the first switching tube is turned off, and the second switching tube is turned on so as to prevent a current from flowing to the negative end of the first power supply from the positive end of the second power supply.

Optionally, the first switching tube and the second switching tube are both Metal Oxide Semiconductor (MOS) tubes.

Optionally, the first switching tube is a first N-channel Metal Oxide Semiconductor (NMOS) tube; and
a source electrode of the first NMOS tube is configured to be connected with the positive end of the first power supply, a drain electrode of the first NMOS tube is connected with the positive input end of the first driving module, and a gate electrode of the first NMOS tube is connected with a first driving circuit, wherein the first driving circuit provides a high level for the gate electrode of the first NMOS tube.

Optionally, the second switching tube is a second NMOS tube; and
a source electrode of the second NMOS tube is configured to be connected with the positive end of the second power supply, a drain electrode of the second NMOS tube is connected with the positive input end of the second driving module, and a gate electrode of the second NMOS tube is connected with a second driving circuit, wherein the second driving circuit provides a high level for the gate electrode of the second NMOS tube.

Optionally, the circuit further includes: a first safety fuse, and a third NMOS tube;
the first switching tube is configured to be connected with the positive end of the first power supply through the first safety fuse; and
a drain electrode of the third NMOS tube is connected with the negative end of the first power supply, a source electrode of the third NMOS tube is connected with the negative input end of the first driving module, and a gate electrode of the third NMOS tube is connected with a third driving circuit, wherein the third driving circuit provides a high level for the gate electrode of the third NMOS tube.

Optionally, the circuit further includes: a second safety fuse, and a fourth NMOS tube;
the second switching tube is configured to be connected with the positive end of the second power supply through the second safety fuse; and a drain electrode of the fourth NMOS tube is connected with the negative end of the second power supply, a source electrode of the fourth NMOS tube is connected with the negative input end of the second driving module, and a gate electrode of the fourth NMOS tube is connected with a fourth driving circuit, wherein the fourth driving circuit provides a high level for the gate electrode of the fourth NMOS tube.

Optionally, the first power supply and the second power supply are −48 V power supplies.

The present application further provides a server, including the above direct-current power supply parallel input anti-reverse-connection circuit, and including: a direct-current power supply parallel input anti-reverse-connection circuit module and a load.

Compared to the prior art, the present application at least has the following advantages:

according to the direct-current power supply parallel input anti-reverse-connection circuit and the server system provided by the present application, the direct-current power supply parallel input anti-reverse-connection circuit includes the first power supply, the second power supply, the first switching tube, the second switching tube, the first driving module, and the second driving module; the first switching tube and the second switching tube form an open circuit when a voltage is suddenly increased so as to prevent a field-effect transistor from being broken down and protect the overall circuit; and the present application effectively solves the problem that in the prior art, when anti-reverse-connection solution that a diode and safety fuses are adopted is used in a redundant power supply system, voltages of two ends of a device are suddenly increased, but currents are not abnormally increased to a certain height and heat, and a circuit cannot cut off the current itself by fusing of the safety fuses, so that the safety fuses cannot take an effect of protecting safety operation of the circuit, the field-effect transistor is broken down, and the circuit is short-circuited, resulting in burning-out of other devices.

BRIEF DESCRIPTION OF THE DRAWINGS

In order to more clearly illustrate the technical solution of the embodiments of the present application or the prior art, the drawings required to be used in the description of the embodiments or the prior art will be briefly introduced below. It is obvious that the drawings in the description are only some embodiments described in the present application, and those of ordinary skill in the art also can obtain other drawings, without any inventive work, according to the drawings.

DETAILED DESCRIPTION

In order to make those skilled in the art understand the solution of the present application better, the technical solutions of the embodiments of the present application will be described below clearly and completely in connection with the drawings in the embodiments of the present application. Apparently, the embodiments described below are a part, but not all, of the embodiments of the present application. Based on the embodiments of the present application, other embodiments obtained by those of ordinary skill in the art without any inventive work all fall within the scope of protection of the application.

In an electronic device using an external power supply, if the power supply of the electronic device is reversely connected, the electronic device may be permanently damaged. In order to prevent the above phenomenon, a diode and safety fuse mode is usually adopted to carry out anti-reverse-connection testing in the prior art. The working principle is that when the polarity of the power supply is correct and a circuit normally works, due to existence of a load, a current is relatively small at the moment, a diode is in a reverse blocking state, and a safety fuse cannot be fused; and when the power supply is reversely connected, the diode is turned on, the current is relatively large at the moment, and then the safety fuse can be fused, so that the supply of the power supply is cut off, and an effect of protecting the load is achieved.

Figure 1:
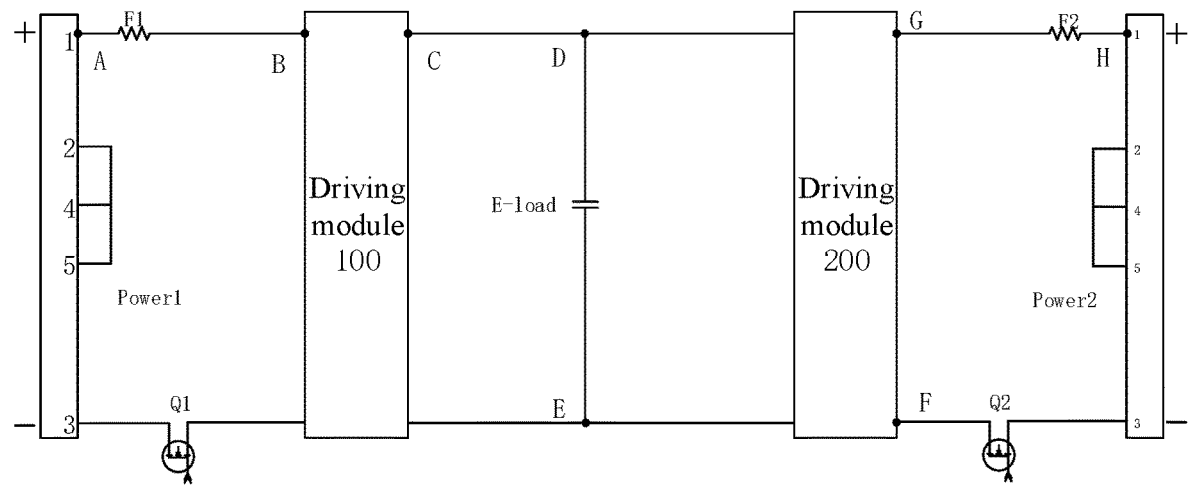
FIG. 1 is a structural schematic diagram of a parallel input anti-reverse-connection circuit applying a conventional input anti-reverse solution provided by the present application.

However, if a diode and safety fuse anti-reverse-connection solution is applied to a redundant power supply, for example, in a power supply 1+1 redundant parallel input scene, as shown in FIG. 1, when two power supplies are subjected to anti-reverse-connection testing, the problem of damage to devices, e.g., a chip in a driving module, an MOS tube and the like, may appear. Although the diode and safety fuse mode is adopted to carry out anti-reverse-connection testing, the phenomenon problem of damage to the devices may also appear when the safety fuse is not fused.

Figure 2:
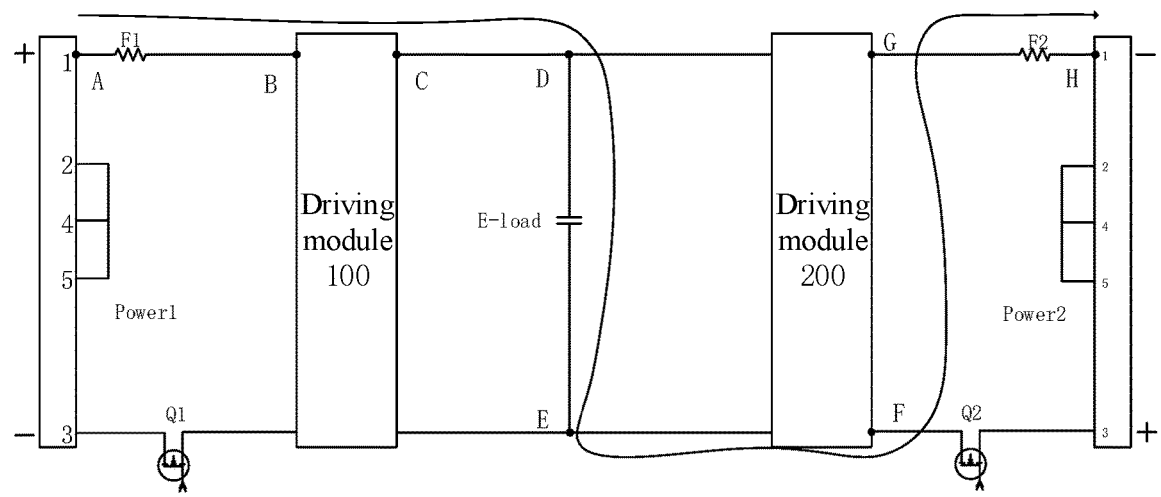
FIG. 2 is a schematic diagram of a current path when a second power supply of the parallel input anti-reverse-connection circuit applying the conventional input anti-reverse solution provided by the present application is reversely connected.

Through long-time efforts and persistent research of the inventor, it is found that in a redundant circuit, by taking a case that a first power supply Power 1 is positively connected and a second power supply Power2 is reversely connected as an example, at the startup moment, the energy trend of the first power supply Power1 may be that, as shown in FIG. 2, energy passes through a safety fuse F1 and a first driving module 100 from a positive electrode of the first power supply Power1, passes through a load E-load, then passes through a second driving module 200 of the second power supply Power2, and reaches a negative electrode of the second power supply Power2 through a safety fuse F2 (i.e., a current reaches a junction D from a junction A through a junction B and a junction C, then reaches a junction E through the load E-load, and finally, reaches a junction H through a junction F and a junction G). Voltages at two ends of the junctions G and F are suddenly increased, so that a field-effect transistor in the driving module 200 may be broken down, but currents are not abnormally increased to a certain height and heat, and a circuit cannot cut off the currents itself through fusing of the safety fuse, resulting in that the safety fuse cannot take an effect of protecting safety operation of the circuit, and even a chip in the driving module 200 is burnt out. This process is equivalent to a case that the second power supply Power2 is short-circuited, resulting in that devices in the second driving module 200 are burnt out.

In order to solve the above problems, the present application provides a direct-current power supply parallel input anti-reverse-connection circuit and a server. The direct-current power supply parallel input anti-reverse-connection circuit includes: a first power supply, a second power supply, a first switching tube, a second switching tube, a first driving module, and a second driving module. A first end of the first switching tube is configured to be connected with a positive end of the first power supply, and a second end of the first switching tube is connected with a positive input end of the first driving module; a negative input end of the first driving module is configured to be connected with a negative end of the first power supply, wherein the negative input end of the first driving module is a grounding end; and the first driving module converts the power supply and provides the converted power supply to a load. A first end of the second switching tube is configured to be connected with a positive end of the second power supply, and a second end of the second switching tube is connected with a positive input end of the second driving module; a negative input end of the second driving module is configured to be connected with a negative end of the second power supply, wherein the negative input end of the second driving module is a grounding end; and the second driving module converts the power supply and then provides the converted power supply to the load. When the second power supply is reversely connected, the first switching tube is turned on, and the second switching tube is turned off, so as to prevent a current from flowing to the negative end of the second power supply from the positive end of the first power supply; and when the first power supply is reversely connected, the first switching tube is turned off, and the second switching tube is turned on so as to prevent a current from flowing to the negative end of the first power supply from the positive end of the second power supply.

According to the direct-current power supply parallel input anti-reverse-connection circuit and the server provided by the present application, the direct-current power supply parallel input anti-reverse-connection circuit includes: the first power supply, the second power supply, the first switching tube, the second switching tube, the first driving module, and the second driving module. The first switching tube and the second switching tube form an open circuit when a voltage is suddenly increased so as to prevent the field-effect transistor from being broken down and protect the overall circuit. By utilizing the switching characteristic of the switching tubes, the present application solves the problem that in the prior art, when the diode and safety fuse anti-reverse-connection solution is used in the redundant power supply, the voltages of two ends of the device are suddenly increased, but the currents are not abnormally increased to a certain height and heat, so that the circuit cannot cut off the current itself through fusing of the safety fuse, then the safety fuse cannot take an effect of protecting safety operation of the circuit, and the circuit is short-circuited, resulting in burning-out of other devices.

Various non-restrictive embodiments of the present application will be illustrated in detail below in connection with the drawings.

Embodiment 1

Figure 3:
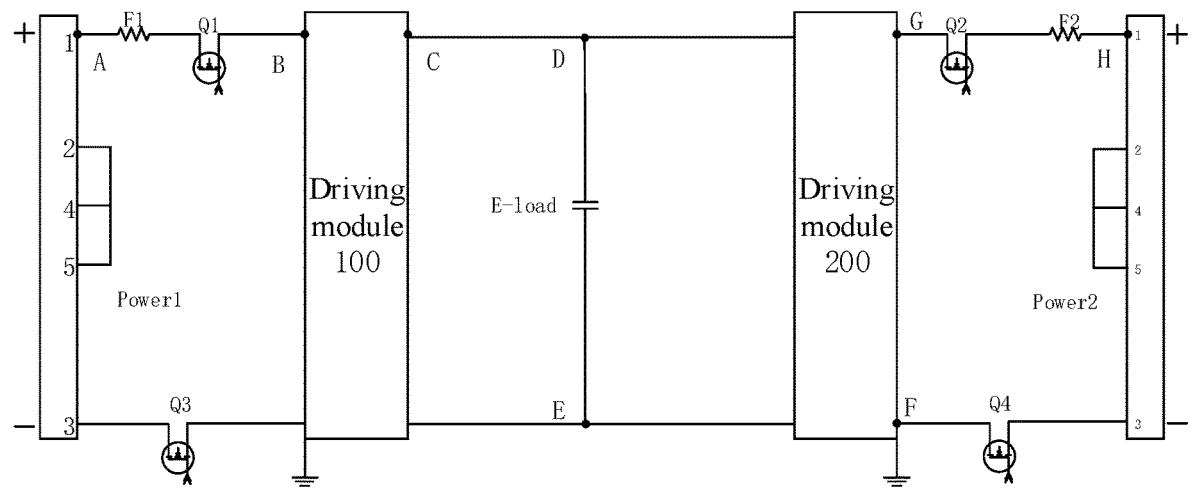
FIG. 3 is a structural schematic diagram of a direct-current power supply parallel input anti-reverse-connection circuit provided by the present application.

With reference to FIG. 3, FIG. 3 is a structural schematic diagram of a direct-current power supply parallel input anti-reverse-connection circuit provided by an embodiment of the present application.

The direct-current power supply parallel input anti-reverse-connection circuit provided by the embodiment of the present application includes a first power supply Power1, a second power supply Power2, a first switching tube Q1, a second switching tube Q2, a first driving module 100, and a second driving module 200.

A first end of the first switching tube Q1 is configured to be connected with a positive end of the first power supply Power1, and a second end of the first switching tube Q1 is connected with a positive input end of the first driving module 100; a negative input end of the first driving module 100 is configured to be connected with a negative end of the first power supply Power1, wherein the negative input end of the first driving module 100 is a grounding end; and the first driving module 100 converts the power supply and provides the converted power supply to a load E-load. A first end of the second switching tube Q2 is configured to be connected with a positive end of the second power supply Power2, and a second end of the second switching tube Q2 is connected with a positive input end of the second driving module 200; a negative input end of the second driving module 200 is configured to be connected with a negative end of the second power supply Power2, wherein the negative input end of the second driving module 200 is a grounding end; and the second driving module 200 converts the power supply and then provides the converted power supply to the load E-load.

Figure 4:
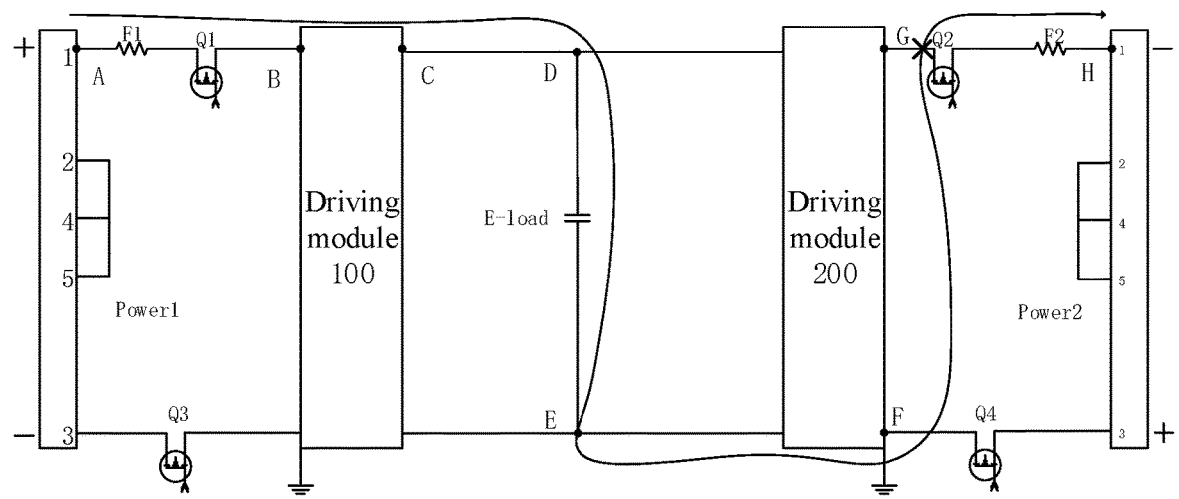
FIG. 4 is a schematic diagram of a current path when a second power supply of a direct-current power supply parallel input anti-reverse-connection circuit provided by the present application is reversely connected.

As shown in FIG. 4, when the second power supply Power2 is reversely connected, i.e., the negative end of the second power supply Power2 is connected with the positive input end of the second driving circuit 200, at the moment, when a current flows to the negative end of the second power supply Power2 from the positive end of the first power supply Power1, the first switching tube Q1 is turned on, and the second switching tube Q2 is turned off, so as to effectively prevent the current from flowing back. Similarly, when the first power supply Power1 is reversely connected, at the moment, a current flows to the negative end of the first power supply Power1 from the positive end of the second power supply Power2, the first switching tube Q1 is turned off, and the second switching tube Q2 is turned on so as to effectively prevent the current from flowing back.

It can thus be seen that regardless of whether the first power supply Power1 or the second power supply Power2 is reversely connected, due to the characteristics of the first switching tube Q1 and the second switching tube Q2, an open circuit is formed so as to prevent the current from burning out a field-effect transistor in the circuit, protect the overall circuit, and solve the problem that in the prior art, the voltages are suddenly increased, but the currents are not abnormally increased to a certain height and heat, so that the circuit cannot cut off the current itself through fusing of a safety fuse, then the safety fuse cannot take an effect of protecting safety operation of the circuit, and the circuit is short-circuited, resulting in burning-out of other devices.

It should be noted that in an implementation mode of the embodiments of the present application, the first power supply Power1 and the second power supply Power2 are both direct-current power supplies.

It should be noted that in an implementation mode of the embodiment of the present application, the voltages of the first power supply Power1 and the second power supply Power2 are −48 V.

Embodiment 2

Figure 5:
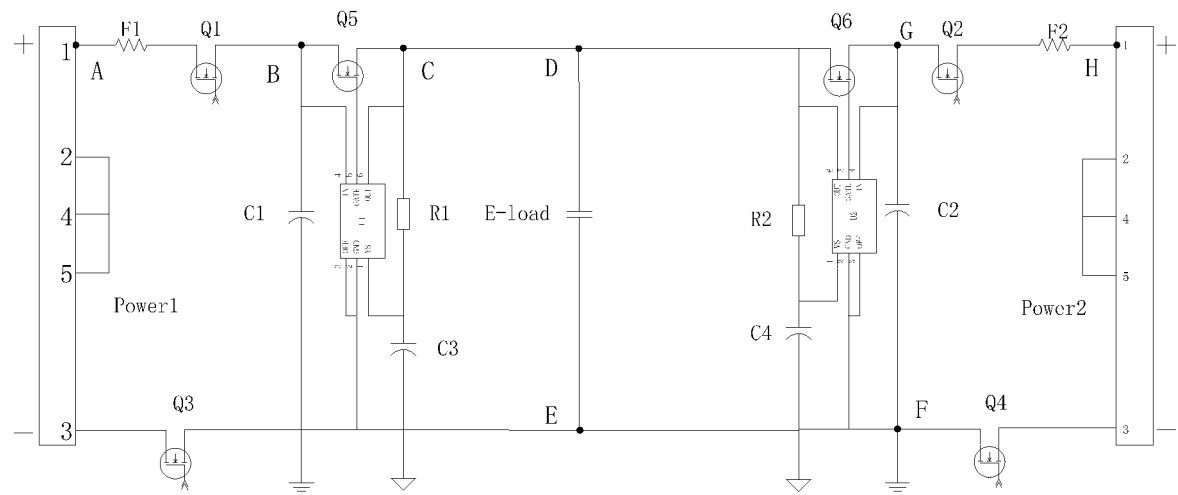
FIG. 5 is a structural schematic diagram of a direct-current power supply parallel input anti-reverse-connection circuit provided by the present application.

With reference to FIG. 5, FIG. 5 is a structural schematic diagram of a direct-current power supply parallel input anti-reverse-connection circuit provided by an embodiment of the present application.

The first switching tube may be a first NMOS tube, the second switching tube may be a second NMOS tube, the first driving module 100 may be a fifth MOS tube Q5, a first chip U1, a first resistor R1, a first capacitor C1, and a third capacitor C3; and the second driving module 200 may be a sixth MOS tube Q6, a second chip U2, a second resistor R2, a second capacitor C2, and a fourth capacitor C4, wherein the first chip U1 and the second chip U2 may be LM505CMK-1.

A source electrode of the fifth MOS tube Q5 is connected with the positive input end of the first driving module 100; a drain electrode of the fifth MOS tube Q5 is connected with a positive output end of the first driving module 100; the drain electrode of the fifth MOS tube Q5 is connected with a fifth pin GATE of the first chip U1;

a first pin VS of the first chip U1 is connected with a second end of the first resistor R1, and the first pin VS of the first chip U1 is connected with a first end of the third capacitor C3; a second pin GND of the first chip U1 is connected with a negative output end of the first driving module 100; a third pin OFF of the first chip U1 is connected with the second pin GND of the first chip U1; a fourth pin IN of the first chip U1 is connected with the positive input end of the first driving module 100; a sixth pin OUT of the first chip U1 is connected with the positive output end of the first driving module 100;

a second end of the first capacitor C1 is connected with the negative input end of the first driving module 100;

a first end of the first resistor R1 is connected with the positive output end of the first driving module 100;

a second end of the third capacitor C2 is connected with the negative output end of the first driving module 100; and the negative input end of the first driving module 100 is connected with the negative end of the first power supply Power1 through a third MOS tube Q3.

Correspondingly, a source electrode of the sixth MOS tube Q6 is connected with the positive input end of the second driving module 200; a drain electrode of the sixth MOS tube Q6 is connected with the positive output end of the second driving module 200; the drain electrode of the sixth MOS tube Q6 is connected with a fifth pin GATE of the second chip U2;

a first pin VS of the second chip U2 is connected with a second end of the second resistor R2, and the first pin VS of the second chip U2 is connected with a first end of the fourth capacitor C4; a second pin GND of the second chip U2 is connected with a negative output end of the second driving module 200; a third pin OFF of the second chip U2 is connected with the second pin GND of the second chip U2; a fourth pin IN of the second chip U2 is connected with the positive input end of the second driving module 200; a sixth pin OUT of the second chip U2 is connected with the positive output end of the second driving module 200;

a second end of the second capacitor C2 is connected with the negative input end of the second driving module 200;

a first end of the second resistor R2 is connected with the positive output end of the second driving module 200;

a second end of the fourth capacitor C4 is connected with the negative output end of the second driving module 200; and the negative input end of the second driving module 200 is connected with the negative end of the second power supply Power2 through a fourth MOS tube Q4.

Figure 6:
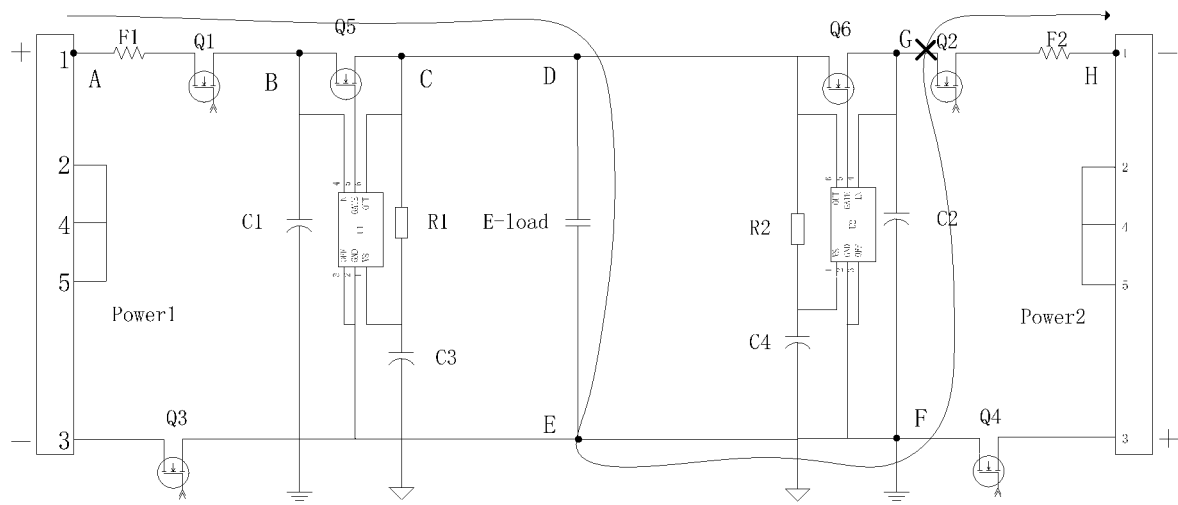
FIG. 6 is a schematic diagram of a current path when a second power supply of a direct-current power supply parallel input anti-reverse-connection circuit provided by the present application is reversely connected.

According to the turn-on condition of an NMOS, it can be known that according to the direct-current power supply parallel input anti-reverse-connection circuit provided by the embodiments of the present application, as shown in FIG. 6, when the second power supply Power2 is reversely connected, i.e., the negative end of the second power supply Power2 is connected with the positive input end of the second driving module 200, energy passes through a first safety fuse F1 and the fifth MOS tube Q5 from the positive end of the first power supply Power1, passes through the load E-load, reversely charges the second capacitor C2, and then reaches the negative end of the second power supply Power2 through a second safety fuse F2, and at the moment, the second NMOS tube Q2 may form an open circuit so as to effectively prevent the case that due to sudden increase of the voltage, the sixth MOS tube Q6 is broken down and the fourth pin IN of the second chip U2 is burnt out, thereby taking an effect of protecting the overall circuit.

Similarly, when the first power supply Power1 is reversely connected, at the moment, the first NMOS tube Q1 may form an open circuit so as to effectively prevent the case that due to sudden increase of the voltage, the fifth MOS tube Q5 is broken down and the fourth pin IN of the first chip U1 is burnt out, thereby taking an effect of protecting the overall circuit.

It can thus be seen that regardless of whether the first power supply Power1 or the second power supply Power2 is reversely connected, the first NMOS tube Q1 and the second NMOS tube Q2 may form the open circuit, and thus, the current is prevented from burning out the field-effect transistor in the circuit, and the overall circuit is protected. By utilizing the switching characteristics of the MOS tube, the present application solves the problem that in the prior art, the voltages are suddenly increased, but the currents are not changed, resulting in that the power supply device is damaged in a case that the safety fuse is not fused.

Figure 7:
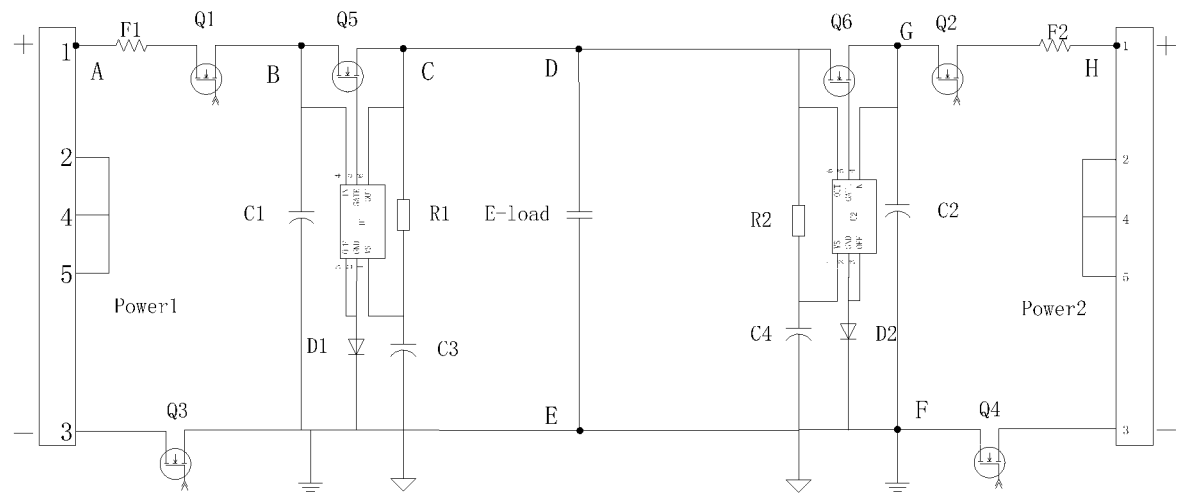
FIG. 7 is a structural schematic diagram of a direct-current power supply parallel input anti-reverse-connection circuit provided by the present application.

It should be noted that as shown in FIG. 7, the second pins of the first chip U1 and the second chip U2 are connected with the negative output end of the driving module through a diode, wherein a voltage of the diode may be 100 V, the diode carries out voltage control when the circuit is turned on so as to ensure that the GND voltage of the chip is unbiased.

Embodiment 3

Figure 8:
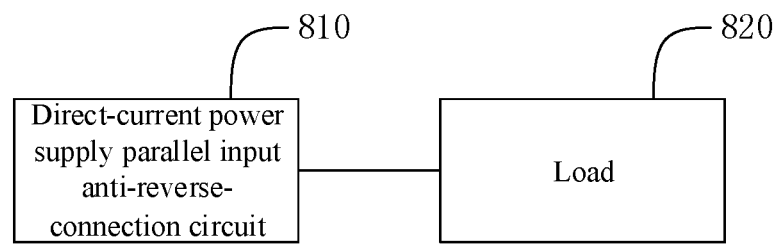
FIG. 8 is a structural schematic diagram of a direct-current power supply parallel input anti-reverse-connection server provided by the present application.

As shown in FIG. 8, FIG. 8 is a structural schematic diagram of a direct-current power supply parallel input anti-reverse-connection server provided by an embodiment of the present application.

A server system provided by an embodiment of the present application includes a direct-current power supply parallel input anti-reverse-connection circuit 810, and further includes a load 820.

After considering the specification and practicing the present application disclosed herein, those skilled in the art could easily think of other implementation solutions of the present application. The present application aims to cover any modifications, applications or adaptive changes of the present application, and these modifications, applications or adaptive changes are in accordance with the general principle of the present application and include common general knowledge or conventional technical means in the art, which is not disclosed by the present application. The description and the embodiments are merely exemplary, and the real scope and the spirit of the present application are indicated by the claims below.

It should be understood that the present application is not limited to the accurate structure described above and shown in the drawings, and various modifications and changes can be made without departure from the scope of the present application. The scope of the present application is only defined by the appended claims.

The above are only the preferred embodiments of the present application and not intended to limit the scope of protection of the present application, and any modifications, equivalent replacements, improvements or the like made within the spirit and principle of the present application shall fall within the scope of protection of the present application.

What is claimed is:

1. A direct-current power supply parallel input anti-reverse-connection circuit, comprising: a first power supply, a second power supply, a first switching tube, a second switching tube, a first driving module, and a second driving module; wherein
    a first end of the first switching tube is configured to be connected with a positive end of the first power supply, and a second end of the first switching tube is connected with a positive input end of the first driving module;
    a negative input end of the first driving module is configured to be connected with a negative end of the first power supply, wherein the negative input end of the first driving module is a grounding end;
    the first driving module converts a power supply and provides the converted power supply to a load;
    a first end of the second switching tube is configured to be connected with a positive end of the second power supply, and a second end of the second switching tube is connected with a positive input end of the second driving module;
    a negative input end of the second driving module is configured to be connected with a negative end of the second power supply, wherein the negative input end of the second driving module is a grounding end;
    the second driving module converts a power supply and then provides the converted power supply to the load;
    wherein, when the second power supply is reversely connected, the first switching tube is turned on, and the second switching tube is turned off, so as to prevent a current from flowing to the negative end of the second power supply from the positive end of the first power supply; and when the first power supply is reversely connected, the first switching tube is turned off, and the second switching tube is turned on so as to prevent a current from flowing to the negative end of the first power supply from the positive end of the second power supply;
    wherein, the first switching tube is a first N-channel Metal Oxide Semiconductor (NMOS) tube; and
    a source electrode of the first NMOS tube is configured to be connected with the positive end of the first power supply, a drain electrode of the first NMOS tube is connected with the positive input end of the first driving module, and a gate electrode of the first NMOS tube is connected with a first driving circuit, wherein the first driving circuit provides a high level for the gate electrode of the first NMOS tube.

2. The circuit according to claim 1, wherein, the first switching tube and the second switching tube are both Metal Oxide Semiconductor (MOS) tubes.

3. The circuit according to claim 1, wherein, the second switching tube is a second NMOS tube;
    a source electrode of the second NMOS tube is configured to be connected with the positive end of the second power supply, a drain electrode of the second NMOS tube is connected with the positive input end of the second driving module, and a gate electrode of the second NMOS tube is connected with a second driving circuit, wherein the second driving circuit provides a high level for the gate electrode of the second NMOS tube.

4. The circuit according to claim 1, further comprising: a first safety fuse, and a third NMOS tube, wherein
    the first switching tube is configured to be connected with the positive end of the first power supply through the first safety fuse; and
    a drain electrode of the third NMOS tube is connected with the negative end of the first power supply, a source electrode of the third NMOS tube is connected with the negative input end of the first driving module, and a gate electrode of the third NMOS tube is connected with a third driving circuit, wherein the third driving circuit provides a high level for the gate electrode of the third NMOS tube.

5. The circuit according to claim 1, further comprising: a second safety fuse, and a fourth MOS tube, wherein
    the second switching tube is configured to be connected with the positive end of the second power supply through the second safety fuse; and
    a drain electrode of the fourth NMOS tube is connected with the negative end of the second power supply, a source electrode of the fourth NMOS tube is connected with the negative input end of the second driving module, and a gate electrode of the fourth NMOS tube is connected with a fourth driving circuit, wherein the fourth driving circuit provides a high level for the gate electrode of the fourth NMOS tube.

6. The circuit according to claim 1, wherein, the first power supply and the second power supply are −48 V power supplies.

7. A server, comprising the direct-current power supply parallel input anti-reverse-connection circuit of claim 1, and comprising: a direct-current power supply parallel input anti-reverse-connection circuit module and a load.

* * * * *